United States Patent [19]

Wilcox

[11] Patent Number: 5,063,965

[45] Date of Patent: Nov. 12, 1991

[54] QUICK DISCONNECT COUPLING

[75] Inventor: Wayne Wilcox, Union City, Pa.

[73] Assignee: Snap-Tite, Inc., Union City, Pa.

[21] Appl. No.: 548,191

[22] Filed: Jul. 5, 1990

Related U.S. Application Data

[63] Continuation of Ser. No. 354,611, May 19, 1989, abandoned.

[51] Int. Cl.$^5$ ............................................. F16L 37/28
[52] U.S. Cl. ............................ 137/614.03; 137/614.04
[58] Field of Search ........................ 137/614.02, 614.03, 137/614.04

[56] References Cited

U.S. PATENT DOCUMENTS

| | | | |
|---|---|---|---|
| 2,471,237 | 5/1940 | Paturczak | 137/614.03 |
| 3,074,430 | 1/1963 | LaBelle | 137/614.2 |
| 4,597,413 | 1/1986 | Buseth | 137/614.04 |
| 4,742,850 | 5/1988 | Ekman | 137/614.03 |
| 4,768,551 | 9/1988 | Allread et al. | 137/614.04 |
| 4,832,080 | 5/1989 | Smith, III | 137/614.04 |

FOREIGN PATENT DOCUMENTS 610652 10/1948 United Kingdom ........... 137/614.03

Primary Examiner—A. Michael Chambers
Attorney, Agent, or Firm—Woodling, Krost & Rust

[57] ABSTRACT

An improved undersea coupler in which a fluid passage is provided in each coupling half. The opening of each passage proximal to the fluid source is controlled by a poppet valve. A sliding sleeve covers the other port of each passage, distal to the fluid source. These distal ports coincide when the coupler is connected, at which position the sliding sleeves are retracted. Sealing between the distal ports and the environment is accomplished by two metal seals backed up by two secondary elastomeric seals. Because the seal arrangement is balanced, and because of the passage design, the system pressure does not cause a high separation force.

7 Claims, 3 Drawing Sheets

QUICK DISCONNECT COUPLING

This application is a continuation of Ser. No. 07/354,611 filed May 19, 1989, now abandoned.

The present invention relates to high reliability subsea couplers for hydraulic fluid lines. In particular, it relates to such couplers which have check valves in each of the mating parts and metal seals to prevent the escape of hydraulic fluid.

BACKGROUND OF THE INVENTION

In undersea fluid pressure transmission lines, as for petroleum operations, high reliability is very important. Typically a number of coupler halves are mounted perpendicularly to a plate or mounting base, with the mating half of each coupler mounted on one or more parallel opposing plates, so that all couplings mate at the same time. Metal-to-metal seals are preferably used for reliability and strength. Examples of such couplers are seen in U.S. Pat. Nos. 4,637,470 to Weathers et al., 4,694,859 to Smith and 4,709,726 to Fitzgibbons. Typically the metal seal will be C-shaped, as in the Smith and Fitzgibbons patents, or V-shaped as in the Weathers connector design.

A coupling arrangement is needed in which the high internal pressure will not tend to cause uncoupling. This will permit the mounting plates, and the means holding the couplers together, to be of lighter construction and will lessen the possibility of mishap. It is for this purpose that the present invention has been made.

SUMMARY OF THE INVENTION

In the present invention, a fluid passage is provided in each coupling half. The opening of each passage proximal to the fluid source is controlled by a poppet valve. A sliding sleeve covers the other port of each passage distal to the fluid source. These distal ports coincide when the coupler is connected, at which position the sliding sleeves are retracted. Sealing between the distal ports and the environment is accomplished by two metal seals backed up by two secondary elastomeric seals. Because the seal arrangement is balanced, and because of the passage design the system pressure does not cause a high separation force.

An object of the present invention is to provide a coupler with high reliability and full connectability under water.

Another object of the invention is to provide such a connector in which the internal pressure does not create a net force tending to cause uncoupling.

DETAILED DESCRIPTION OF A PREFERRED EMBODIMENT OF THE INVENTION

Figure 1:
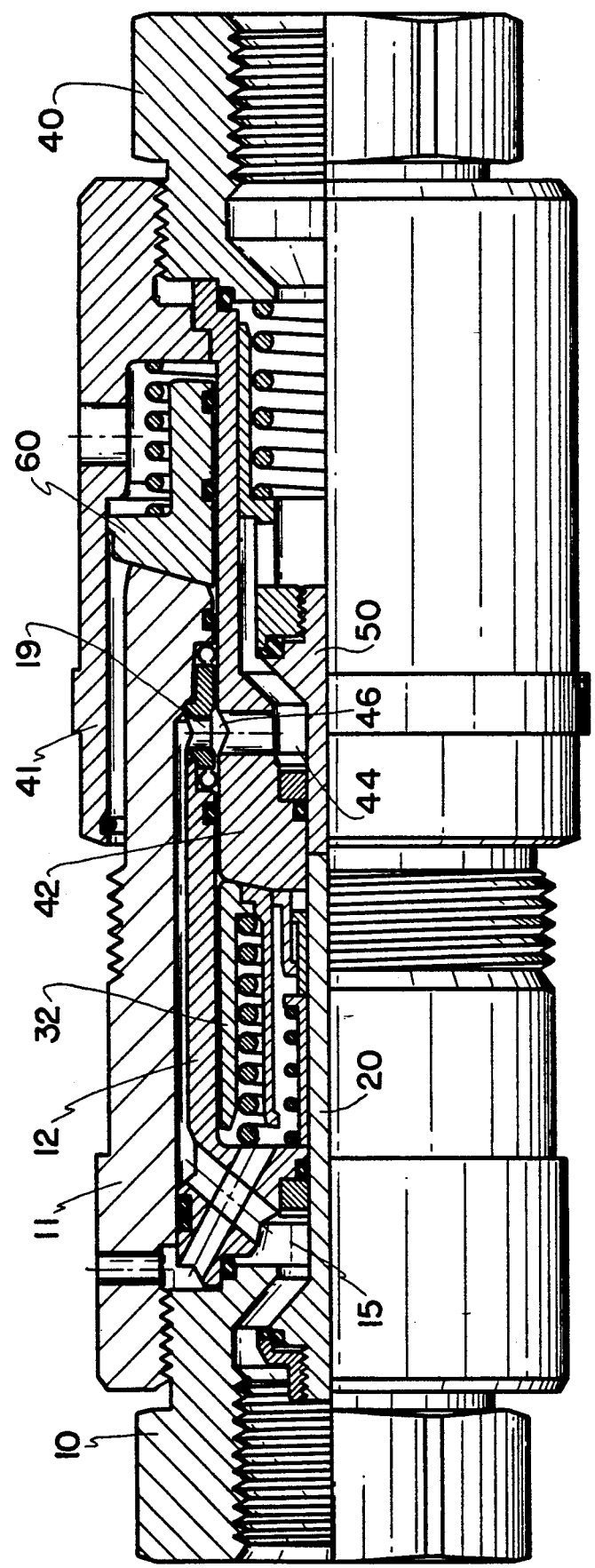
FIG. 1 is a lengthwise sectional view of a preferred embodiment of the coupler of the present invention as connected.
Figure 2:
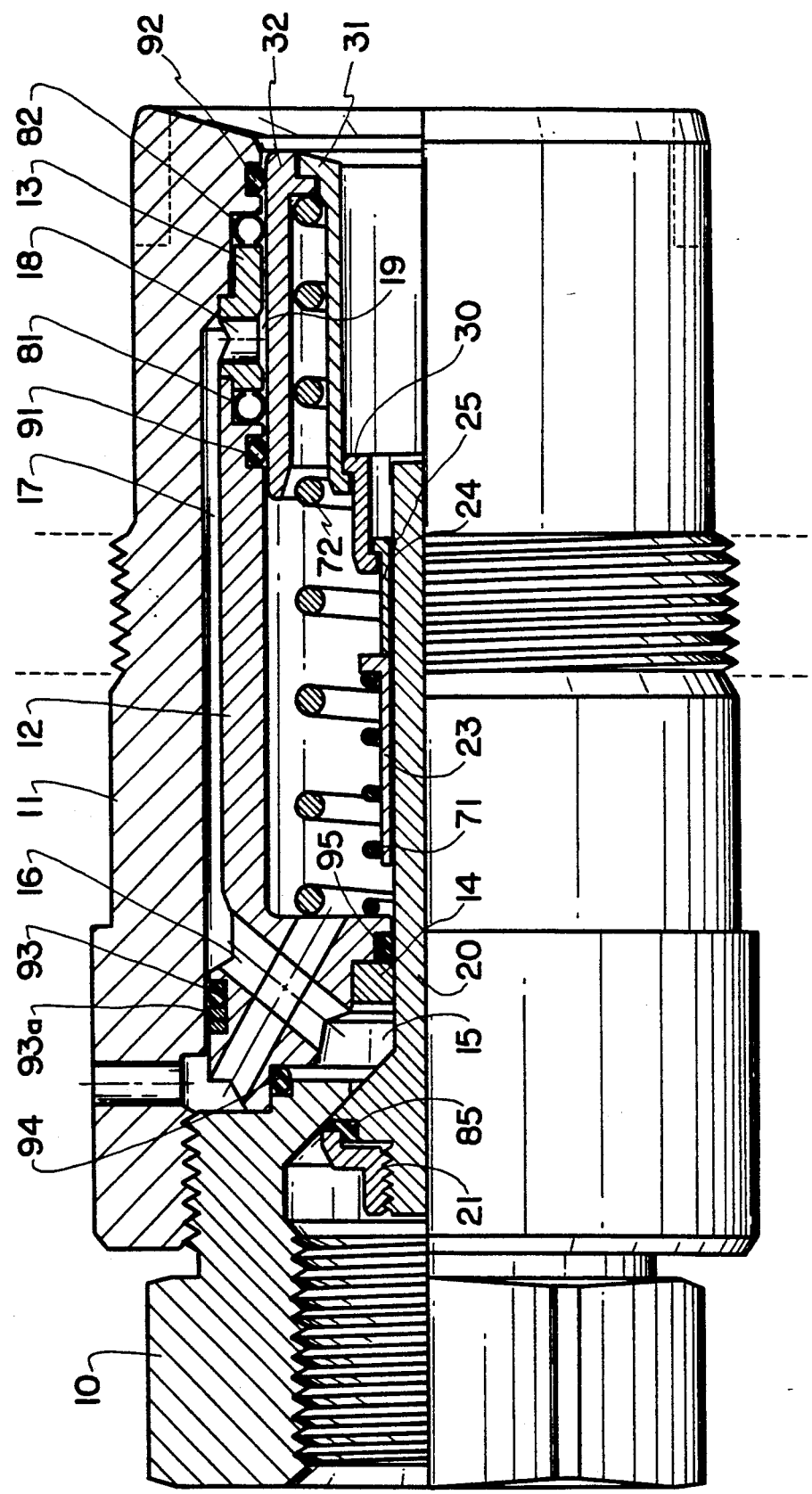
FIG. 2 is a lengthwise sectional view of the left or coupler half of the coupler seen in FIG. 1.
Figure 3:
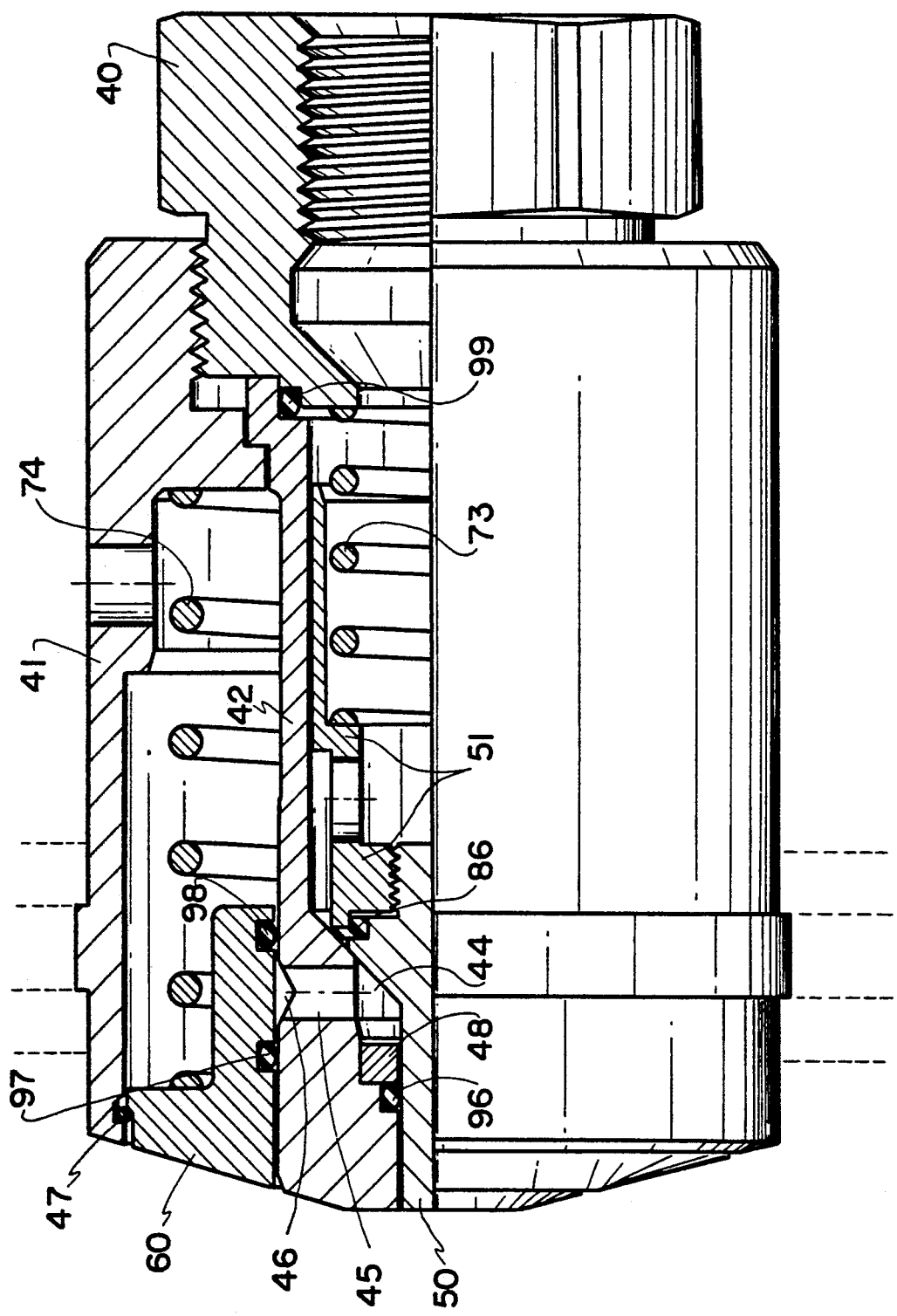
FIG. 3 is a lengthwise sectional view of the right or nipple half of the sam coupler.

In FIG. 1, the presently preferred embodiment of the connected coupler is shown, and in FIGS. 2 and 3 the left and right halves, respectively.

In the left or "coupler" assembly half, best seen in FIG. 2, there are three groups of generally cylindrical components, each group moving essentially as a unit and performing its function cooperatively. It will be understood by one skilled in the art that there will be equivalent configurations which could be used to perform the functions as described. On the extreme left is a coupler adaptor 10 which connects the coupler assembly to a left-hand fluid source. A coupler body 11 is connected to it, preferably by screw threads, and radially inside coupler body 10 is a cage 12. A first cage seal retainer 13 is interposed between cage 12 and coupler body 11, and a second cage seal retainer 14 is press-fitted into cage 12. As will be seen from the drawing, cage 12 and cage seal retainers 13 and 14 interfit with coupler adaptor 10 and coupler body 11 so that all "move together" (in practice, they are stationary) as one unit. This unit, which may be called the coupler body, serves primarily to provide a passage for the fluid to and from the left hand fluid source. This passage consists of a left coupler port 15, a duct or ducts 16 in cage 12, a cylindrical section 17 between cage 12 and coupler body 11, and a duct or ducts 18 in cage seal retainer 13, ending at right coupler port 19.

The coupler body also serves to provide support for the various other components, springs and seals to be mentioned, and has additional ducts connecting the outside (seawater) environment with its interior portions. It should be noted that the additional duct or ducts in cage 12 are offset from the fluid duct or ducts 15 and not connected with it or them.

At the center of the coupler half is a coupler valve 20, in the preferred embodiment of the poppet type, covering left coupler port 15 which is proximal to the left fluid source. Coupler valve seal retainer 21 is threaded to it as shown. Cylindrical sleeves 23 and 24 surround the stem portion of coupler valve 20, which fits slidingly into second cage seal retainer 14. A snap ring 25, fitting into a groove in coupler valve 20, restrains cylindrical sleeve 24, and with it sleeve 23, from rightward movement with respect to coupler valve 20. Leftward movement is restrained by a spring 71 to be discussed. It can thus be seen that coupler valve 20, seal retainer 21 and sleeves 23 and 24 move as a unit. Its primary function is to open and close left coupler port 15; it also serves to support the telescoping sliding sleeve next to be discussed.

The telescoping sliding sleeve arrangement consists of three parts. A first telescoping sleeve component 30 slides along the outside of cylindrical sleeve 24 and is restricted from sliding off it to the right by mating shoulders on the respective sleeves. Second telescoping sleeve component 31 engages sleeve component 30 in the same manner. Third telescoping sleeve component 32 engages sleeve component 31 non-slidingly, being restricted from rightward movement by the contact of mating shoulders on it and component 31 and being restricted from leftward movement, to the same extent as component 31, by a spring 72. As FIG. 2 shows, in the uncoupled position of the coupler, telescoping sleeve component 32 overlies and seals off right coupler port 19, distal to the left fluid source.

Referring to FIG. 3, the right or "nipple" assembly half of the coupler also has three groups of cooperating components. The first one, or nipple body assembly, consists in the preferred embodiment of a nipple adaptor 40, a nipple housing 41 screw-threaded to it, a nipple 42 interfitting between the first two named components, a sleeve retaining ring 47, and a nipple seal retainer 48. The nipple body assembly, all components of which are stationary with respect to each other, serves the same functions as the coupler body already described. In particular, it has a first or proximal nipple port 44 between nipple 42 and the right fluid source, which is connected by a duct 45 to a second or distal nipple port 46. As seen in FIG. 1, the right coupler port 19 and second nipple port 46 are located so as to be in communication when the coupler is connected.

Also analogously to the left half, the nipple assembly has a nipple valve 50 covering first nipple port 44. A nipple retainer 57, which also retains a seal to be discussed, is threaded to it.

The second nipple port 46 is closed in the uncoupled configuration by a sliding sleeve 60 which is urged leftward by a spring 74 but retained at the end of its leftward travel by sleeve retaining ring 47. As will be seen in FIG. 3, the nipple body assembly is provided with ducting connecting the outside environment with its interior, similarly to the coupler body. This ducting is of course to permit the retraction and extension of the sleeve assemblies.

In the interiors of the coupler halves are a first spring 71, urging the coupler valve 20 to close left coupler port 15, a second spring 72 urging the telescoping sliding sleeve to close right coupler port 19, a third spring 73 urging the nipple valve 50 to close first nipple port 44 and a fourth spring 74 urging sliding sleeve 60 to close second nipple port 46.

Various metal and elastomeric seals are provided. The most important ones are a first and second metal seal, 81 and 82 respectively, one located on each side of right coupler port 19. In the preferred embodiment these are C-shaped, but it will be clear to those skilled in the art that other shapes may be employed. The diameters of seals 81 and 82 on each side of the pressure source are identical, so there is no net separation force tending to separate the coupler. Metal seals 81 and 82 are backed u by first and second secondary elastomeric O-ring seals 91 and 92 respectively. Other elastomeric O-rings 93, 94 and 95 are interposed between the fluid ducts and the seawater ducts as seen in FIG. 2. O-ring 93 is supported by a Teflon ® back-up ring 93a. In the nipple half there are elastomeric O-rings 96 between nipple valve 50 and the nipple 42, 97 and 98 between the nipple 42 and sliding sleeve 60, and 99 between nipple adaptor 40 and nipple 42. Finally, L-shaped elastomeric seals 85 and 86 are used to seal the poppet valve seats; seal 85 is mounted between coupler valve 20 and its seal retainer 21 and seal 86 between nipple valve 50 and nipple seal retainer 48.

When the coupler halves are abutted and pushed together, as seen in FIG. 1, the sliding sleeve 60 retracts rightwardly, the telescoping sliding sleeve arrangement in the left half retracts leftwardly, and the respective body halves interfit to juxtapose the distal fluid ports 19 and 46. At approximately the same time, nipple valve 50 abuts coupler valve 20 and both are unseated, opening the proximal fluid ports 15 and 44, and completing the fluid pathway between the left and right.

Because of the design of the fluid passages in the closed coupler, there is no net separation force on the passage walls tending to separate the coupler as there is in most of the prior art designs.

When the coupler is uncoupled, both sliding sleeves are again urged forward sealing the distal ports and preventing the ingress of sea water or other contaminants.

The invention has been described in detail with particular emphasis on the preferred embodiments thereof, but it should be understood that variations and modifications within the spirit and scope of the invention may occur to those skilled in the art to which the invention pertains.

What is claimed is:

1. An improved coupler for joining a first and a second source of a fluid, comprising
   a coupler assembly comprising coupler body means, coupler valve means and coupler sleeve means, said coupler body means having a coupler passage therein for said fluid, said coupler passage having a first coupler fluid port between it and said first fluid source, and having a second coupler fluid port, said coupler valve means being urged by first spring means to close said first coupler fluid port, and said coupler sleeve means being urged by second spring means to close said second coupler fluid port; and
   a nipple assembly comprising nipple body means, nipple valve means, and nipple sleeve means said nipple body means having a nipple passage therein for said fluid, said nipple passage having a first nipple fluid port between it and said second fluid source and having a second nipple fluid port, said nipple valve means being urged by third spring means to close said first nipple fluid port, and said nipple sleeve means being urged by fourth spring means to close said second nipple fluid port;
   said nipple assembly being insertable into said coupler assembly against the action of said first through fourth spring means to a position in which all said fluid ports are open and said second coupler and nipple fluid ports are in communication.

2. The improved coupler of claim 1 and further comprising first and second metal seals at said communicating second coupler and nipple ports, said first and second metal seals exerting no net separation force tending to separate said coupler.

3. The improved coupler of claim 1 and in which there is no net separation force upon said coupler when said nipple assembly is inserted into said coupler assembly to said position.

4. A coupling comprising a coupler half and a nipple half movable between connected and disconnected modes, said coupler half having a coupler fluid port in a coupler port bearing member, a coupler valve sliding over said port and movable between open and closed positions, first and second metal seals on opposite sides of said coupler port, a first spacer member between said first and second metal seals and maintaining said first and second metal seals in spaced relationship, said metal seals sealing between said coupler port bearing member and said nipple half in the connected mode; said nipple half having a nipple fluid port in a nipple port bearing member, a nipple valve sliding over said port, third and fourth seals on opposite sides of said nipple port, said seals sealing between said nipple port bearing member and said nipple valve; said coupler and nipple valves being retracted in the connected mode and said coupler and nipple ports being in communication.

5. The coupling of claim 4 in which said metal seals are generally C-shaped in cross-section which defines an open end portion, said open end portion of said first and second metal sleeves facing each other and said coupler fluid port in at least one of said open and closed positions of said coupler valve.

6. The coupling of claim 5 wherein said open end portion of said first and second metal seals face said coupler portion all positions of said coupler valve.

7. The coupling of claim 4 and in which all axial forces in said coupler and nipple halves are balanced so that there is no net axial force tending to cause disconnection of said coupling.

* * * * *